(No Model.)

V. MONTALTO.
SELF REGULATING PUMP.

No. 536,356. Patented Mar. 26, 1895.

Witnesses
H. van Oldenneel
E. K. Sturtevant

Inventor
Vito Montalto
by Richards
his Attorneys

UNITED STATES PATENT OFFICE.

VITO MONTALTO, OF BOCKENHEIM, GERMANY.

SELF-REGULATING PUMP.

SPECIFICATION forming part of Letters Patent No. 536,356, dated March 26, 1895.

Application filed October 24, 1894. Serial No. 526,870. (No model.)

*To all whom it may concern:*

Be it known that I, VITO MONTALTO, mechanical engineer, residing at Bockenheim, near Frankfort-on-the-Main, in the Kingdom of Prussia, Germany, have invented new and useful Improvements in Self-Regulating Pumps, of which the following is a specification.

My invention relates to a self regulating pump, viz., an apparatus for pumping liquids and automatically stopping the work or decreasing the amount of the liquid if a certain pressure is reached, without changing the motion of the driving gear. For this purpose I do not connect the pumping piston directly with a pitman or whatever mechanism is used for imparting motion to the pump, but I provide a second piston in the hollow piston rod of the pumping piston and connect it with the driving rod. This hollow piston I fill with a liquid, which is allowed to escape only if a predetermined pressure is reached.

In order to enable anybody skilled in the art to carry out my invention I will describe with reference to the annexed drawings an apparatus embodying my invention in the form which I think the most preferable.

Figure 1:
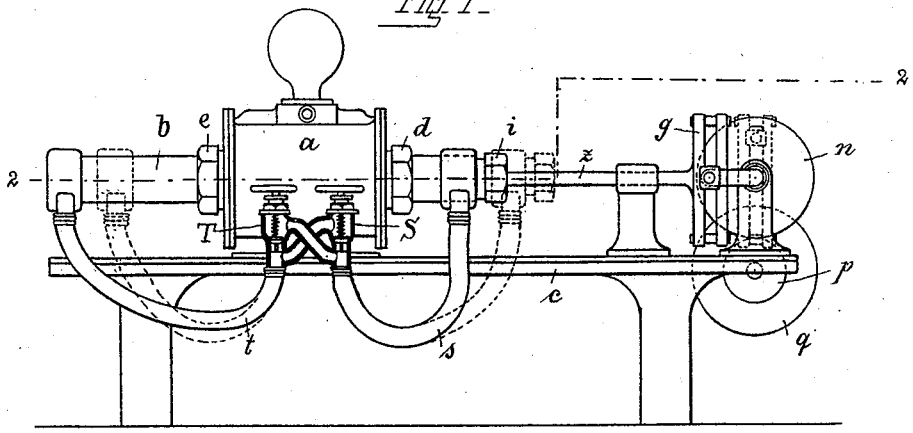
Figure 3:
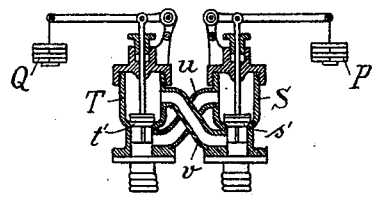
Figure 2:
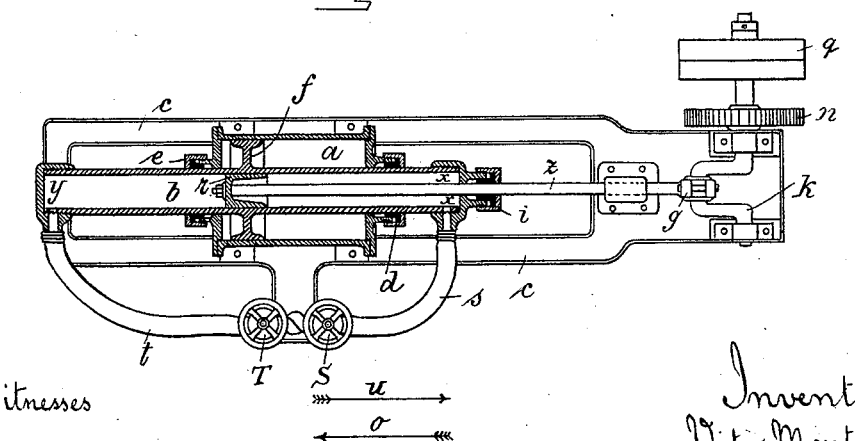

Figure 1 is an elevation; Fig. 2, a sectional view according to line 2, 2 of Fig. 1. Fig. 3 is a sectional view of the valves.

On the frame $c$ is fixed the pumping cylinder $a$, which is provided with valves and pipes (not shown in the drawings) as usual.

$b$ is the piston rod integral with the piston $f$ and is a cylinder itself.

$r$ is the piston fitted into the hollow piston rod $b$ and driven by the rod $z$, which is held tight by the stuffing box $i$. The rod $z$ receives its motion in an ordinary way—for instance, from the tooth wheels $p$ and $n$, the crank shaft $k$ by the sliding head $g$. The piston rod $b$ is fitted in the cylinder $a$ by stuffing boxes $d$ and $e$ in the usual way.

S and T are valves communicating by flexible pipes $s$ and $t$ with the extreme points $x$ and $y$ of the cylinder formed by the hollow piston rod $b$. Now each valve comprises valve plates $s'$ and $t'$, which are pressed against their seats either by weights P and Q or springs in a well known manner. The valves are connected by little pipes $u$ and $v$ in the way shown in Fig. 3, each pipe leading from under the one valve plate into the chamber above the other.

When the apparatus is used both chambers of the hollow piston rod $b$ and the adjoining pipes are filled with a liquid.

The operation is then as follows: A reciprocating motion is imparted to the rod $z$ and the piston $r$. This motion is transferred to the piston $f$ unaltered as long as the piston $r$ is held in its relative position to the piston rod $b$ by the two water columns inclosed between the piston $r$ and the plates of the valves S and T. If the pressure on the piston $f$ increases and surpasses the pressure on the piston $r$ controlled by the valves S and T, the piston $f$ will come to a standstill and the piston $r$ will move in the hollow piston rod $b$ displacing water either through the opening $x$, pipe $s$, valve S, pipe $u$, pipe $t$, opening $y$ from one chamber to the other in the direction of the arrow, or if the piston $r$ itself is moving in the direction of the arrow $o$, it displaces the water in the direction of the arrow $u$ by the way, $y$, $t$, T, $v$, $s$, $x$. If afterward the pressure on the piston $f$ decreases again, the piston $r$ and the hollow piston rod $b$ will act like one rigid body.

Instead of the liquid compressed gas may be used, and the liquid escaping from one side of the cylinder $b$ may be displaced to another receptacle, than the other side of the cylinder though I think the construction as shown and specified is preferable.

It is clear that the essence of my invention is not changed by such a modification.

Now, what I claim, and desire to secure by Letters Patent, is the following:

1. In a self regulating pump the combination with the pumping cylinder and the pumping piston of a hollow piston rod, a piston fitted into it, means for imparting a reciprocating motion to this latter piston, and means for allowing the escape of a liquid filled into the hollow piston rod at a predetermined pressure substantially as and for the purpose described.

2. In a self regulating pump the combination with the pumping cylinder and the pumping piston rigidly connected with a second cylinder, a second piston sliding in the said second cylinder, and valves communicating with both chambers of the said second cylinder, adapted to be opened at a predetermined pressure substantially as described.

3. In a self regulating pump the combination with the pumping cylinder and the pumping piston of a hollow piston rod, a piston fitted into the said hollow piston rod, pressure valves communicating with the two chambers of the hollow piston rod, and pipes leading from under the plate of one valve above the plate of the other substantially as and for the purpose described..

4. In a self regulating pump the combination with the pumping cylinder and the pumping piston of a hollow piston rod, a piston fitted into the said hollow piston rod, weighted valves fixed on the frame of the apparatus, and two flexible pipes communicating with the two chambers of the hollow piston rod and with the valves substantially as described, In testimony whereof I have signed my name to this specification in the presence of two subscribing witnesses.

VITO MONTALTO.

Witnesses:
JOSEPH FINGAR,
RICHARD WIRTH.